W. M. HAMPTON.
EXTENSION DRIVE FOR TRACTORS.
APPLICATION FILED NOV. 2, 1920.
1,411,916.
Patented Apr. 4, 1922.
5 SHEETS—SHEET 4.
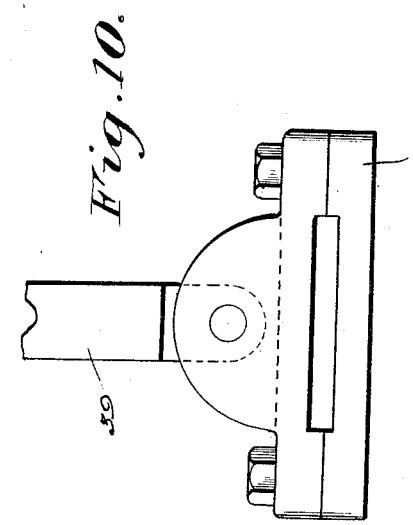
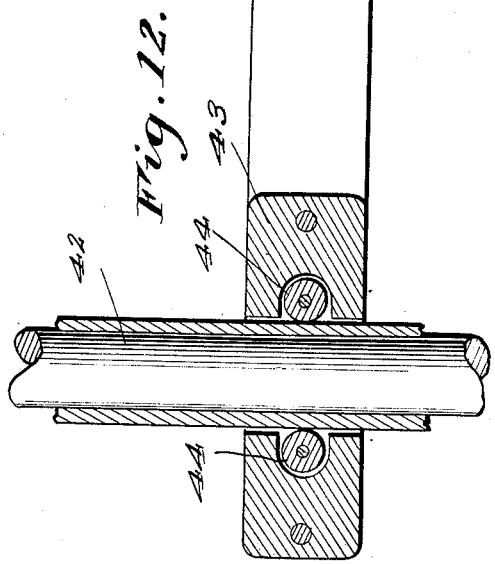
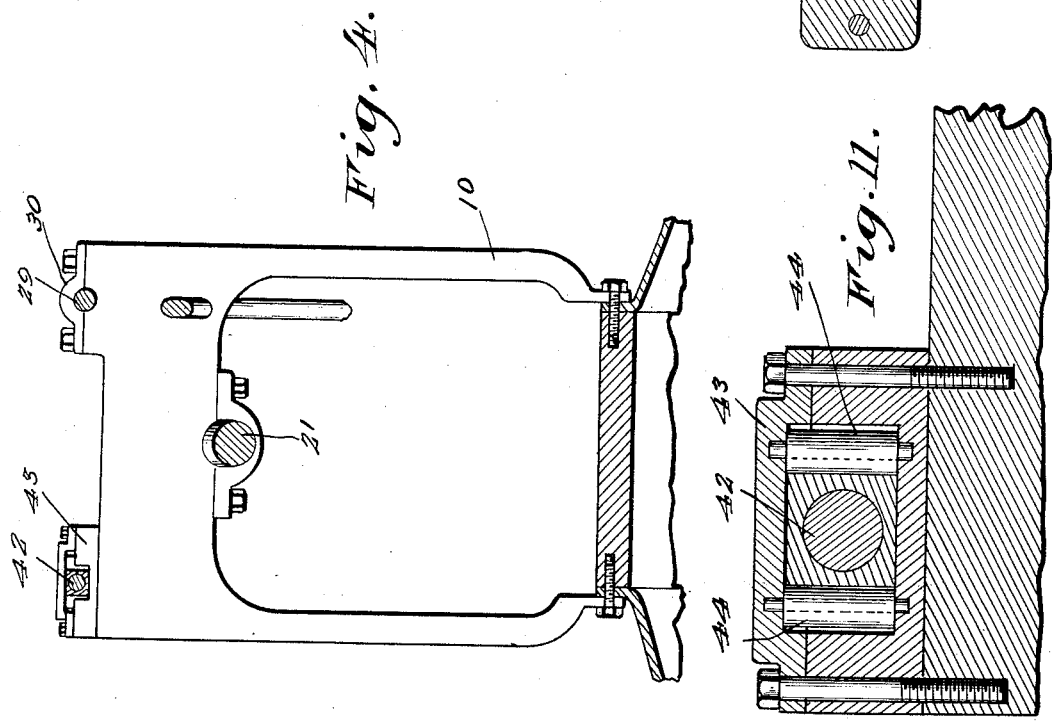
WITNESSES
R. A. Thomas
W. M. Hampton INVENTOR
BY Victor J. Evans
ATTORNEY

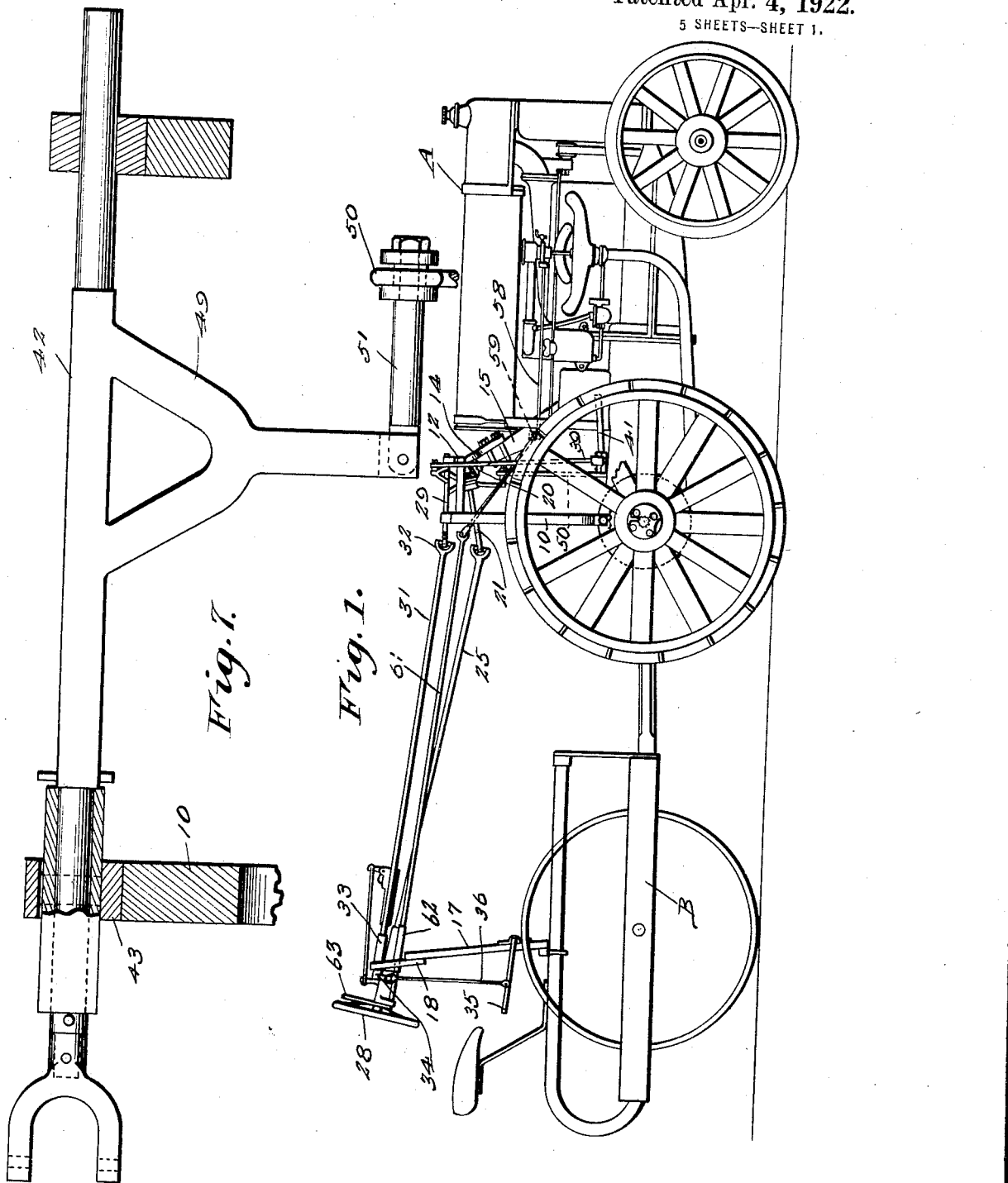

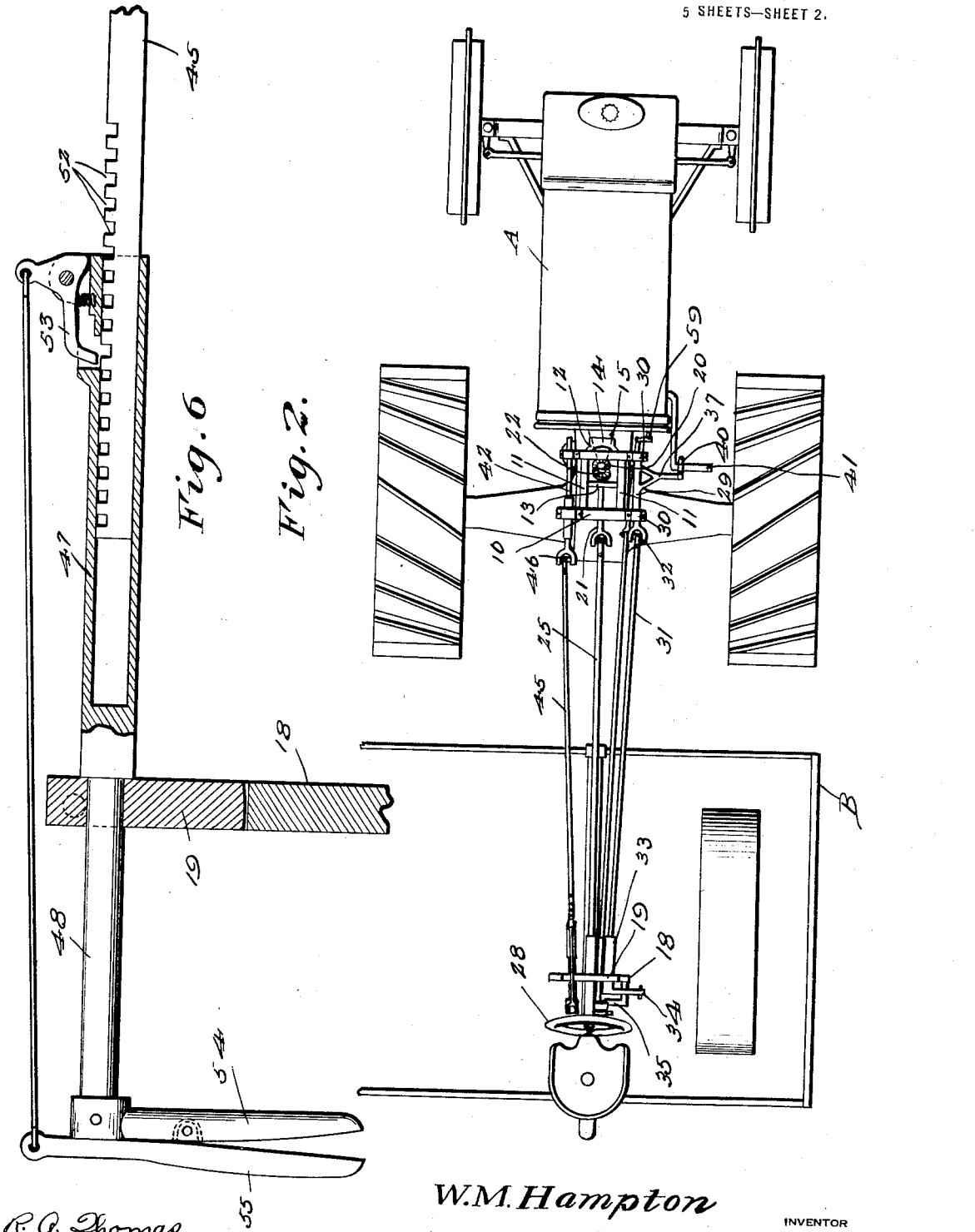

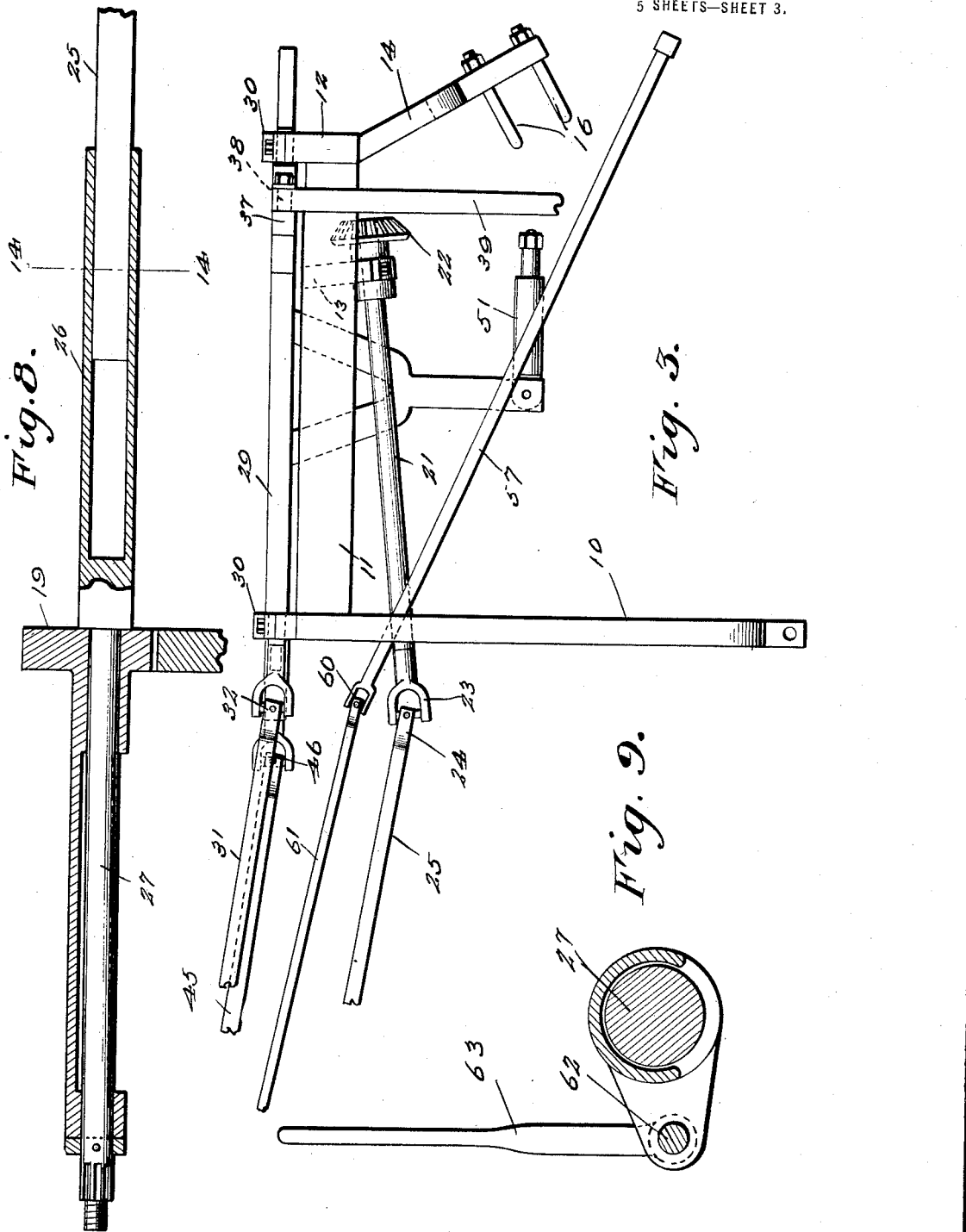

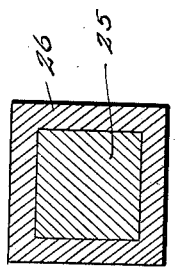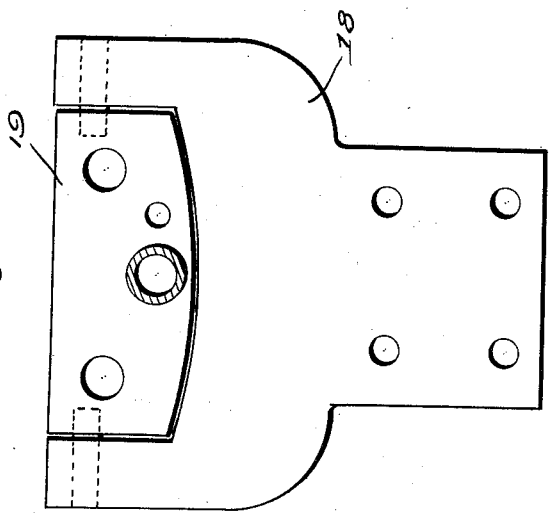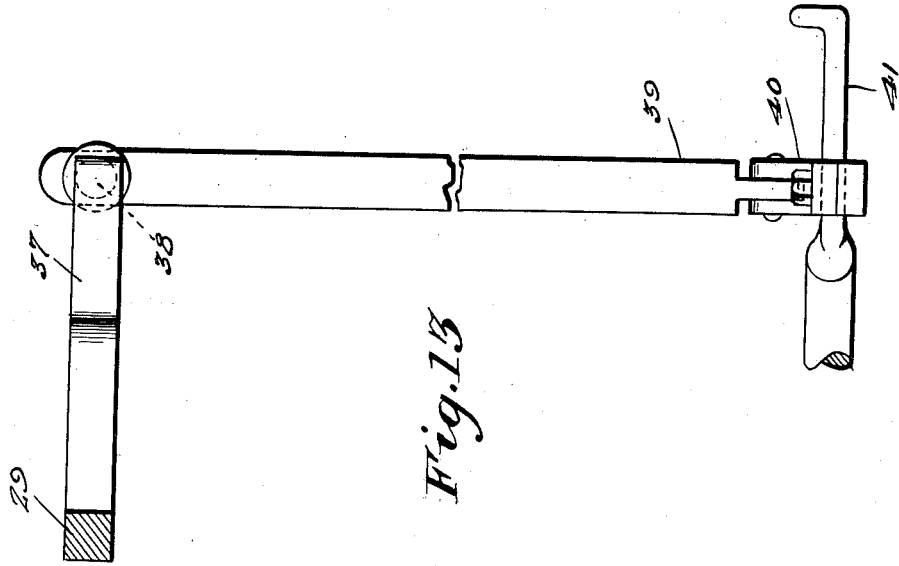

UNITED STATES PATENT OFFICE.

WILLIAM MARTIN HAMPTON, OF WHITEWATER, MISSOURI.

EXTENSION DRIVE FOR TRACTORS.

1,411,916. Specification of Letters Patent. Patented Apr. 4, 1922.

Application filed November 2, 1920. Serial No. 421,308.

*To all whom it may concern;*

Be it known that I, WILLIAM M. HAMPTON, a citizen of the United States, residing at Whitewater, in the county of Cape Girardeau and State of Missouri, have invented new and useful Improvements in Extension Drives for Tractors, of which the following is a specification.

This invention relates to tractors, and has for its object the provision of extension drive by means of which the tractor can be guided and otherwise properly manipulated from the seat of the machine coupled to the tractor.

The invention embodies the novel construction of means for guiding the tractor from a remote point, and means for adjusting the clutch, shifting the gears and controlling the throttle.

The nature and advantages of the invention will be readily understood when the following detailed description is read in connection with the accompanying drawings, the invention residing in the construction, combination and arrangement of parts as claimed.

In the drawings forming parts of this application like numerals of reference indicate similiar parts in the several views and wherein:—

Figure 1— is a side elevation of a tractor showing the extension drive associated therewith.

Figure 2— is a top plan view.

Figure 3— is an enlarged fragmentary view of the extension drive separated from the tractor.

Figure 4— is an end elevation of the supporting frame showing the manner of connecting it with the tractor.

Figure 5— is a detail view of the yoke and swinging panel.

Figure 6— is a detail view of the locking means for the gear shift lever.

Figure 7— is a detail view of the gear shift operating shaft;

Figure 8— is a fragmentary view of the shaft for guiding the tractor.

Figure 9— is a detail view, partly in section, showing the manner of associating the latter mentioned shaft with the steering wheel.

Figure 10— is a detail view, showing the connection between the clutch pedal and one of the operating shafts.

Figure 11— is a sectional view, showing the bearing in which the shaft is mounted for actuating the gear shift lever.

Figure 12— is a sectional view taken at right angles to Figure 11.

Figure 13— is a view showing the connection between the extension drive and the clutch pedal.

Figure 14— is a sectional view taken on line 14—14 of Figure 8.

Referring to the drawings in detail A indicates generally a tractor of well known construction, and B the machine coupled to the tractor.

The mechanism forming the subject matter of my invention embodies a frame including a vertically disposed bifurcated member 10 which reposes upon the differential housing of the tractor and is bolted or otherwise suitably secured thereto as shown. Projecting forwardly from the member 10 are spaced parallel bars 11 which are connected together at one end by a transverse element 12, and also connected together at a point in their length by a transverse strip 13. Depending from the transverse element 12 is an apron 14 which is secured to the steering column 15 of the tractor through the instrumentality of U-shaped fastening elements 16. Secured to the machine B is a vertically disposed strip of suitable material indicated at 17 which together with the frame above described constitutes the supporting structure for the movable parts of the mechanism for controling the tractor. Secured to the strip 17 is a yoke 18 in which is pivotally mounted a panel 19.

When equipping a tractor with the mechanism forming a subject matter of this invention, the steering wheel is removed, and a bevel gear 20 is associated with the steering post in place of the steering wheel. For guiding the tractor from a remote point, I utilize a shaft 21 which is journaled between the bifurcated member 10 and the transverse strip 13 of the frame above referred to. One end of the shaft supports a bevel gear 22 which meshes with the gear 20 to rotate the steering post upon rotation of the shaft 21. This shaft projects through the bifurcated member 10 and is formed with a yoke 23 forming part of universal joint, the yoke 24 carried by a square shaft 25 being connected with the yoke 23 in the usual manner to provide the universal coupling referred to. The square shaft 25 may be of any suitable length, and is telescopically fitted into the hollow square portion 26 of a section of the shaft 25, which section also includes a cylindrical portion 27 journaled in the panel 19. The cylindrical portion 27 is constructed to accommodate the steering wheel 28 of the tractor, which as above stated has been removed from the steering post of the tractor. By reason of this construction and arrangement of parts, it is obvious that the tractor can be guided from the driver's seat of the machine B to which the tractor is coupled. The universal joint provides for the proper steering of the tractor irrespective of the angle at which it may be positioned with respect to the machine B. The swinging of panel 19 compensates for the relative movements of the tractor A and the machine B when traveling over irregular surface, to prevent breaking of the shaft 25 or subjecting the latter to undue strain.

In order to control the clutch of the tractor from the machine B, I make use of a shaft 29 journaled in bearings 30 on the frame above mentioned. This shaft projects a slight distance rearwardly of the bifurcated member 10 of the frame and is associated with the section 31 of a sectional shaft by means of a universal joint 32. The section 31 is square and is telescopically fitted in the other section 33 of similar cross sectional configuration, the section 33 being journaled in the swinging panel 19. Projecting at right angles from the section 33 of this shaft is an extention 34 connected to a foot pedal 35 mounted upon the strip 17, by means of a rod 36. Projecting horizontally from the shaft 29 is an arm 37 which has an offset extremity 38, and pivotally connected with this offset extremity is a depending rod 39. The lower end of the rod carries a clamp 40 which connects the rod 39 with the clutch pedal 41 of the tractor. It is thus apparent, that when the foot pedal 35 is depressed, the shaft 29 is rotated in the proper direction to depress the clutch pedal 41 and thus disengage the clutch, which is essential prior to shifting the gears for a change of speed.

Slidably and rotatably mounted upon the frame above mentioned is a shaft 42 arranged in bearings 43 one of which is equipped with rollers 44 to minimize friction and thus facilitate sliding of the shaft for the purpose to be presently described. This shaft is coupled to the section 45 of a sectional shaft by a universal joint 46, the section 45 being square and telescopically fitted in the other section 47 of the shaft which includes a hollow portion of the same cross section configuration as the section 45, and a cylindrical portion 48 which is both slidably and rotatably fitted to the swinging panel 19. Depending from the shaft 42 is an arm 49 which terminates in a plane occupied by the upper end of the gear shaft lever 50, the latter being provided with an opening to receive a horizontally disposed stub shaft 51 which is pivoted to the lower end of the arm 49. It will thus be noted, that when the shaft 42 is rotated the shaft lever 50 is moved to one side or the other in the usual manner to gear the tractor for different speeds, the lever 50 being subsequently moved in either forward or rearward direction. It will be observed that the operating shafts associated with the swinging panel 19 all include telescopic sections so that the length of the shafts may be varied as occasion requires, and to permit use of the mechanism in the tractor with the machines of different characters. However, in order to effect a sliding adjustment of the shaft 42 for the purpose above mentioned, it is necessary that the sections 45 and 47 of the operating shaft be held fixed relatively in an adjusted position, and for this purpose I provide the section 45 with teeth 52, the latter being engaged by a pivoted locking dog 53 mounted on the section 47 of said shaft. This dog is spring-pressed and normally held out of engagement from the section 45 of the shaft. Pivoted upon the handle 54 of this shaft is a manipulating element 55 which is adapted to be actuated by the handle 54, is grasped to throw the dog 53 into engagement with the teeth 52, the dog 53 being connected with the manipulating element 55 by means of a rod 56.

Journaled in the bifurcated member 10 is a shaft 57 which is suitably connected to the throttle 58 as at 59. The shaft 57 is connected by means of a universal joint 60 to the section 61 of a sectional operating shaft for imparting rotation to the shaft 57. The other section 62 of said sectional shaft is hollow to telescopically receive the section 61. The section 62 passes through a swinging panel 19 and is equipped with a lever 63 by means of which sectional shaft is actuated. Except when the sections 45 and 47 of the shaft which actuates the gear shaft control lever is fixed relatively, the sections of each sectional shaft are permitted movement toward and away from each other when the tractor and the machine B coupled thereto travel over rough or irregular surface.

While it is believed that from the foregoing description the nature and advantages of the invention will be readily understood, I desire to have it known that I do not limit myself to what is shown and described and that such changes may be resorted to when desired as fall in the scope of what is claimed.

What I claim :—

1. An extension drive for tractors comprising a supporting structure, a plurality of shafts journaled on said structure and connected respectively to the clutch pedal, gear shift lever, throttle and steering post of the tractor, said shafts being independently operable and each including a universal joint in its length, the shaft connected to the gear shift lever being mounted for sliding movement, a swinging panel remote from said tractor, and all of said shafts being supported by said panel for the purpose specified.

2. An extension drive for tractors comprising a supporting structure, means on the structure and connected with the steering post of the tractor for guiding the latter, means on the structure connected with the throttle for guiding the latter, means supported by the structure and connected with the gear shift lever for controlling the latter, means for guiding the clutch, the latter mentioned means including a shaft journaled on said supporting structure, an arm projecting from said shaft, a rod connecting the arm with the clutch pedal whereby the clutch is actuated upon rotation of said shaft, a foot operated pedal and a connection between the pedal and said shaft whereby the latter is rotated when the pedal is depressed.

3. The combination with a tractor and a movable object coupled thereto, of an extension drive for the tractor comprising a supporting structure mounted on the tractor, and including a member fixed to the said object, a panel swingingly mounted on said member, a plurality of independently operable shafts journaled on said supporting structure and said swinging panel, said shafts being connected respectively to the clutch, gear shift lever, throttle and steering post of the tractor, a universal joint included in the length of each shaft, and each shaft including telescopic sections for the purpose specified.

4. An extension drive for tractors comprising a frame including a vertical member adapted to be secured to the tractor, parallel bars projecting from said member, transverse elements connecting the bars together, an apron depending from one of said transverse elements, means for securing said apron to the steering column of the tractor, a shaft journaled between said member and one of said transverse elements, a connection between the shaft and the steering post for guiding the tractor, said shaft including telescopic sections, a universal joint in said shaft, and additional shafts journaled in said member and connected respectively to the clutch pedal, gear shift lever and throttle for the purpose specified.

5. An extension drive for tractors comprising a supporting structure, a plurality of shafts journaled on said structure and connected respectively to the gear shift lever, throttle, steering post and clutch pedal of the tractor, said shafts being independently operable and including a universal joint in their length, the shaft connected to the gear shift lever being mounted for sliding movement, an arm depending from said shaft at right angles thereto, a rod projecting forwardly from said arm in a similar relation, means for associating said rod with the gear shift lever, and a swinging panel supporting all of said shafts as and for the purpose specified.

6. An extension drive for tractors comprising a supporting structure, a plurality of shafts journaled on said structure and connected respectively to the clutch pedal, gear shift lever, throttle and steering post of the tractor, said shafts being independently operable and each including a universal joint in its length, each shaft including telescopic sections for the purpose specified, a foot pedal swingingly mounted on said supporting structure, an extension projecting at right angles from the clutch operating shaft, and a rod connecting the extension from said foot pedal for the purpose specified.

In testimony whereof I affix my signature.

WILLIAM MARTIN HAMPTON.